United States Patent
Osada

(10) Patent No.: US 11,701,797 B2
(45) Date of Patent: Jul. 18, 2023

(54) COMPOSITE MATERIAL MOLDING JIG AND COMPOSITE MATERIAL MOLDING METHOD

(71) Applicant: SUBARU CORPORATION, Tokyo (JP)

(72) Inventor: Tamotsu Osada, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 31 days.

(21) Appl. No.: 16/750,183

(22) Filed: Jan. 23, 2020

(65) Prior Publication Data
US 2020/0156332 A1 May 21, 2020

Related U.S. Application Data

(63) Continuation of application No. PCT/JP2018/014177, filed on Apr. 2, 2018.

(30) Foreign Application Priority Data

Jul. 25, 2017 (JP) .................... 2017-143970

(51) Int. Cl.
*B29C 33/50* (2006.01)
*B29C 70/48* (2006.01)
(Continued)

(52) U.S. Cl.
CPC ............ *B29C 33/505* (2013.01); *B29C 70/48* (2013.01); *B29C 70/549* (2021.05); *B29K 2105/0872* (2013.01)

(58) Field of Classification Search
CPC ......... B29C 70/44; B29C 70/48; B29C 70/54; B29C 33/0016; B29C 33/50; B29C 33/505
See application file for complete search history.

(56) References Cited

U.S. PATENT DOCUMENTS 3,187,069 A * 6/1965 Pincus et al. ....... B29C 44/3415
264/46.8
3,651,180 A * 3/1972 Glueckert ............... B29C 43/12
264/51
(Continued)

FOREIGN PATENT DOCUMENTS

CN 106313378 A 1/2017
JP 3-268911 A 11/1991
(Continued)

OTHER PUBLICATIONS

The First Office Action issued in Chinese Patent Application No. 201880047436.2 dated Jun. 29, 2021, with English machine translation.

(Continued)

*Primary Examiner* — Andrew D Graham
(74) *Attorney, Agent, or Firm* — Troutman Pepper Hamilton Sanders LLP

(57) ABSTRACT

According to one implementation, a composite material molding jig 3 includes a tubular member 5 and at least one rigid plate member 6 (6A, 6B) so that a composite material structure O (O1, O2) having a hollow structure can be formed easily. The tubular member 5 has flexibility. The at least one rigid plate member 6 (6A, 6B) reinforces strength of the tubular member 5 partially. The tube is used in a state where air is introduced inside the tube. Further, according to one implementation, a composite material molding method includes using the above-mentioned composite material molding jig 3 in order to produce a composite material structure O (O1, O2) so that the composite material structure O (O1, O2) having a hollow structure can be formed easily.

12 Claims, 8 Drawing Sheets

(51) Int. Cl.
*B29C 70/54* (2006.01)
*B29K 105/08* (2006.01)

(56) References Cited

U.S. PATENT DOCUMENTS

| | | | | |
|---|---|---|---|---|
| 3,979,249 | A * | 9/1976 | Nicholls | B29D 30/26 156/416 |
| 4,062,917 | A * | 12/1977 | Hill | B29C 33/68 264/102 |
| 4,323,218 | A * | 4/1982 | Plum | E06B 3/267 249/65 |
| 4,877,469 | A * | 10/1989 | Szyms | B29C 43/104 156/123 |
| 4,923,541 | A * | 5/1990 | Burger | B29C 53/566 156/156 |
| 4,935,185 | A * | 6/1990 | Mott | B29C 70/865 264/257 |
| 4,963,215 | A * | 10/1990 | Ayers | B29C 70/345 156/286 |
| 5,062,781 | A * | 11/1991 | Szyms | B29C 43/3642 425/52 |
| 5,087,193 | A * | 2/1992 | Herbert, Jr. | B29C 43/3642 425/389 |
| 5,242,523 | A * | 9/1993 | Willden | B29D 99/0014 156/285 |
| 5,266,249 | A * | 11/1993 | Grimes, III | B29C 70/446 264/45.2 |
| 5,904,972 | A * | 5/1999 | Tunis, III | B29C 70/548 428/178 |
| 6,151,743 | A * | 11/2000 | Church | B29C 53/585 14/73 |
| 6,217,000 | B1 * | 4/2001 | Younie | B29D 99/0003 249/184 |
| 6,458,309 | B1 * | 10/2002 | Allen | B29D 99/0014 156/197 |
| 6,620,369 | B1 * | 9/2003 | Mead | B29C 70/44 264/409 |
| 7,527,222 | B2 * | 5/2009 | Biornstad | B64C 1/068 244/120 |
| 7,625,618 | B1 * | 12/2009 | Allen | B29C 70/44 428/36.91 |
| 7,854,874 | B2 | 12/2010 | Martin et al. | |
| 8,377,247 | B2 * | 2/2013 | Guzman | B29C 70/342 156/285 |
| 8,377,248 | B2 * | 2/2013 | Coleman | B29C 70/443 156/287 |
| 8,419,402 | B2 * | 4/2013 | Guzman | B29C 70/865 425/110 |
| 8,500,066 | B2 * | 8/2013 | Lewis | B64D 45/00 244/119 |
| 8,585,856 | B1 * | 11/2013 | Boone | B29D 99/0014 156/285 |
| 8,617,687 | B2 * | 12/2013 | McCarville | B64C 1/061 428/117 |
| 8,926,313 | B2 | 1/2015 | Sana et al. | |
| 8,985,174 | B2 | 3/2015 | Louie et al. | |
| 9,120,553 | B2 * | 9/2015 | Gensewich | B64C 1/12 |
| 9,272,495 | B1 * | 3/2016 | Robins | B64C 1/00 |
| 9,623,641 | B1 * | 4/2017 | Chapman | B29C 33/405 |
| 2002/0027187 | A1 * | 3/2002 | Sato | B29C 70/543 249/187.1 |
| 2002/0135090 | A1 * | 9/2002 | Koren | B29C 37/0007 264/101 |
| 2004/0130072 | A1 * | 7/2004 | Sekido | B29C 70/48 264/408 |
| 2004/0183227 | A1 * | 9/2004 | Velicki | B29C 33/505 264/236 |
| 2005/0102814 | A1 * | 5/2005 | Anderson | B29C 70/543 29/455.1 |
| 2005/0191919 | A1 * | 9/2005 | Krogager | B29C 33/448 442/59 |
| 2005/0230552 | A1 * | 10/2005 | Engwall | B29C 33/485 244/133 |
| 2006/0290028 | A1 * | 12/2006 | Pleite | B29C 70/44 264/258 |
| 2007/0080481 | A1 * | 4/2007 | Kismarton | B29C 70/44 264/236 |
| 2007/0096368 | A1 * | 5/2007 | Hanson | B29C 70/446 264/314 |
| 2007/0176327 | A1 * | 8/2007 | Petersson | B29D 99/0014 264/319 |
| 2008/0116618 | A1 * | 5/2008 | Martin | B29C 70/44 264/480 |
| 2009/0025448 | A1 * | 1/2009 | Krogager | B29C 70/54 72/341 |
| 2009/0166921 | A1 * | 7/2009 | Jacob | B29C 33/46 264/219 |
| 2009/0197050 | A1 * | 8/2009 | Pridie | B29C 70/44 428/174 |
| 2009/0294040 | A1 * | 12/2009 | Fernandez | B29C 33/505 156/245 |
| 2010/0024964 | A1 * | 2/2010 | Ingram, Jr. | B29C 70/382 156/189 |
| 2010/0139850 | A1 * | 6/2010 | Morris | B29C 70/446 156/242 |
| 2010/0139857 | A1 * | 6/2010 | Pham | B32B 37/1009 156/286 |
| 2010/0276069 | A1 * | 11/2010 | Lengsfeld | B29D 23/001 156/156 |
| 2011/0094663 | A1 * | 4/2011 | Guille | B29C 33/485 156/242 |
| 2011/0272086 | A1 * | 11/2011 | Dittman | B29C 73/30 156/155 |
| 2011/0277918 | A1 * | 11/2011 | Lee | B29C 33/505 156/156 |
| 2012/0024468 | A1 * | 2/2012 | Chaume | B29C 33/505 156/243 |
| 2012/0052247 | A1 * | 3/2012 | Pook | B29C 66/474 428/161 |
| 2012/0219660 | A1 * | 8/2012 | Sana | B29C 70/44 425/470 |
| 2012/0235336 | A1 * | 9/2012 | Sana | B29C 33/505 269/47 |
| 2012/0261057 | A1 * | 10/2012 | Bergmann | B29C 70/44 156/156 |
| 2013/0036922 | A1 * | 2/2013 | Stewart | B30B 11/001 100/35 |
| 2013/0139945 | A1 * | 6/2013 | Buerkner | B29C 33/505 156/60 |
| 2013/0139961 | A1 * | 6/2013 | Gear | B29C 70/304 156/247 |
| 2013/0161850 | A1 * | 6/2013 | Harris | B29C 35/0227 264/40.1 |
| 2013/0175731 | A1 * | 7/2013 | Doddman | B29C 70/446 264/250 |
| 2013/0316147 | A1 * | 11/2013 | Douglas | B29D 99/0003 428/172 |
| 2013/0333830 | A1 * | 12/2013 | Stewart | B29C 70/44 156/182 |
| 2014/0103561 | A1 * | 4/2014 | Huang | B29C 33/3821 264/46.6 |
| 2014/0186588 | A1 * | 7/2014 | Victorazzo | B29C 70/865 428/178 |
| 2014/0327187 | A1 * | 11/2014 | Hurdle | B29C 70/443 264/443 |
| 2015/0158211 | A1 * | 6/2015 | Gensewich | B29C 43/3642 264/571 |
| 2015/0174844 | A1 * | 6/2015 | Brizon | B29D 99/0014 156/245 |
| 2015/0343715 | A1 * | 12/2015 | Cruzado Parla | B29C 70/549 264/571 |
| 2016/0001467 | A1 * | 1/2016 | Gunther | B29C 70/30 264/219 |
| 2016/0046044 | A1 * | 2/2016 | Santiago | B29C 33/505 156/60 |
| 2016/0059443 | A1 * | 3/2016 | Thomas | B29C 70/30 156/247 |
| 2016/0176073 | A1 * | 6/2016 | Spexarth | B29C 35/02 264/39 |

(56) References Cited

U.S. PATENT DOCUMENTS

| | | | |
|---|---|---|---|
| 2016/0332395 A1 | 11/2016 | Abe et al. | |
| 2016/0339615 A1* | 11/2016 | Abe | B29C 70/46 |
| 2016/0339682 A1* | 11/2016 | Bahe | B29C 33/505 |
| 2017/0072647 A1* | 3/2017 | Perrillat | B29C 70/546 |
| 2017/0120481 A1* | 5/2017 | Ingram, Jr. | B29C 33/505 |
| 2017/0210038 A1* | 7/2017 | Heath | B29C 33/505 |
| 2017/0334095 A1* | 11/2017 | Harshberger | B29C 33/405 |
| 2019/0118420 A1* | 4/2019 | Hirabayashi | B29C 33/505 |

FOREIGN PATENT DOCUMENTS

| | | |
|---|---|---|
| JP | 4-223140 A | 8/1992 |
| JP | 2001-150465 A | 6/2001 |
| JP | 2003-39566 A | 2/2003 |
| JP | 2009-542460 A | 12/2009 |
| JP | 2010-510111 A | 4/2010 |
| JP | 2011-62846 A | 3/2011 |
| JP | 2011-98527 A | 5/2011 |
| JP | 2011-235635 A | 11/2011 |
| JP | 2013-78937 A | 5/2013 |
| JP | 2015-142993 A | 8/2015 |

OTHER PUBLICATIONS

Notification of Transmittal of Translation of the International Preliminary Report on Patentability in corresponding International Application No. PCT/JP2018/14177 dated Feb. 6, 2020.
Notice of Reasons for Refusal issued in corresponding Japanese Patent Application No. 2019-532368 dated Jun. 24, 2020, with machine translation.
Supplementary European Search Report issued in corresponding European Patent Application No. 18 83 7979 dated Mar. 12, 2021.
Musch, G., et al., "Tooling with reinforced elastomeric materials" Composites Manufacturing 3(2):101-111 (1992).
International Search Report and Written Opinion issued in corresponding Japanese Patent Application No. PCT/JP2018/0174177 dated Jun. 5, 2018 (in Japanese).
Second Office Action with Machine Translation for Chinese Patent Application 201880047436.2; 17 pages.
First Office Action in European Patent Application 18837979.6; dated Feb. 9, 2022; 4 pages.
Third Office Action with Machine Translation for Chinese Patent Application 201880047436.2; 30 pages.
Decision of Rejection dated Aug. 2, 2022 in Chinese Application No. 201880047436.2; with English machine translation; 24 pages.

\* cited by examiner

COMPOSITE MATERIAL MOLDING JIG AND COMPOSITE MATERIAL MOLDING METHOD

CROSS REFERENCES TO RELATED APPLICATIONS

This is a continuation of Application PCT/JP2018/14177, filed on Apr. 2, 2018.

This application is based upon and claims the benefit of priority from Japanese Patent Application No. 2017-143970 filed on Jul. 25, 2017; the entire contents of which are incorporated herein by reference.

FIELD

Implementations described herein relate generally to a composite material molding jig and a composite material molding method.

BACKGROUND

Conventionally, a composite material, such as GFRP (Glass Fiber Reinforced Plastics) or CFRP (Carbon Fiber Reinforced Plastics), which is a resin reinforced by fibers has been used as a material of a structural object, such as an aircraft structural object.

As a method of molding a composite material, two methods are known. One method is performed by laminating prepregs consisting of fiber sheets impregnated with an uncured thermosetting resin, forming the laminated body of the prepregs into a shape to be mold, and subsequent thermal curing of the laminated body of the prepregs with vacuuming. The prepregs are heated and cured by an oven or an autoclave apparatus. The process of forming a shape of prepregs is called shaping in order to distinguish from molding of a composite material by thermal curing. Meanwhile, the other method is an RTM (Resin Transfer Molding) method under which fiber sheets previously laminated according to a shape of a composite material to be mold are impregnated with a thermosetting resin by vacuuming, and subsequently, the thermosetting resin is heated and cured.

Various jigs, such as a rigid mold and a bladder bag, have been devised for laminating and shaping prepregs and fibers. As a concrete example, in order to mold a web of a spar included in a wing structure of an aircraft, composed of a panel and spars attached to the panels, a jig for holding a shape, composed of plates made of GFRP and coupled with each other through a silicone rubber sheet so that vacuuming can be performed, has been proposed (for example, refer to Japanese Patent Application Publication JP1991-268911 A). Meanwhile, a vacuum bag composed of a flexible diaphragm and a rigid frame enclosed in the flexible diaphragm so as to be used repeatedly has been proposed (for example, refer to Japanese Patent Application Publication JP2013-078937 A).

On the other hand, as a method of molding a composite frame used as a part of an aircraft or the like, an RTM method which uses a tubular core made of a flexible synthetic resin, such as a rubber, in addition to a metal outer mold and an inner mold made of a synthetic resin or a rubber has also been proposed (for example, refer to Japanese Patent Application Publication JP2001-150465 A).

A wing structure and a fuselage structure of an aircraft are each often composed of a composite material having a structure in which elongated reinforcement members have been attached to a panel. Examples of a reinforcement member of a panel include a rib and a stringer besides a spar. In recent years, a composite material structure composed of a panel and reinforcement members attached to the panel is produced by co-curing, instead of thermal curing of respective parts, for the purpose of reducing increase in manufacturing cost and manufacturing time due to assembling parts. The co-curing is a molding method which simultaneously heats and cures reinforcement members and a panel.

When a composite material structure composed of a panel and reinforcement members attached to the panel is molded by co-curing, a laminated body of prepregs for each reinforcement member and a laminated body of prepregs for the panel are produced respectively. After that, the laminated bodies of the prepregs are assembled, and subsequently, the assembled laminated bodies of the prepregs is heated and cured. Thereby, the composite material structure can be produced. Alternatively, an integrated laminated body of prepregs having a panel and reinforcement members formed on the panel may be produced, and subsequently, the integrated laminated body of the prepregs is heated and cured.

When a reinforcement member attached to a panel has a hat-shaped cross section, a composite material structure is hollow. Therefore, it is necessary to shape fibers, impregnated with an uncured resin, into a hollow structure. Thus, various forming jigs have been used for shaping fibers, impregnated with an uncured resin, into a hollow structure, and also performing subsequent thermal curing with vacuuming.

Conventional methods for molding a composite material structure composed of a panel and a reinforcement member, of which cross section is hat-shaped, attached to the panel are generally classified into an OML (outer mold line) jig method and an IML (inner mold line) jig method. The OML jig method is performed by disposing a rigid mold on one surface of a panel on which the reinforcement member is not placed, i.e, the OML side of the panel while bagging the other surface of the panel on which the reinforcement member is placed, i.e, the IML side of the panel, for applying the atmospheric pressure. On the contrary, the IML jig method is performed by disposing a rigid mold on the IML side of a panel while bagging the OML side of the panel for applying the atmospheric pressure.

As a specific example of method for molding a hollow composite material structure under the IML jig method, a method of placing a bladder bag between a resin for a panel and a resin for a reinforcement member, i.e., inside the reinforcement member is known (for example, refer to Japanese Patent Application Publication JP2011-062846 A). A bladder bag is made of elastomer, and is a kind of inflatable mandrel into which air is injected to be used. Even under the IML jig method, it is necessary to place a rigid plate on the OML side of a panel before bagging in order to secure accuracy.

Meanwhile, as a specific example of method for molding a hollow composite material structure under the OML jig method, there is a method of placing a solid mandrel served as a core jig between a resin for a panel and a resin for a reinforcement member, i.e., inside the reinforcement member (for example, refer to Japanese Patent Application Publication JP2010-510111 A). In addition, an OML jig method of placing a hollow inner member, made of a thermosetting resin, inside a reinforcement member and integrating the inner member with the reinforcement member by thermal curing is proposed (for example, refer to Japanese Patent Application Publication JP2003-039566 A).

However, the IML jig method requires a mold corresponding to a shape of a reinforcement member. Therefore, there is a problem that it is necessary to produce a mold having a complicated structure. Moreover, prepregs for a panel have to be laminated on a bladder bag. Therefore, it may be difficult to keep a panel flat. In other words, it is necessary to design elasticity and strength of a bladder bag so that the bladder bag can support a laminated body of prepregs for a panel. In addition, since an uncured resin is placed between an upper rigid mold and a lower rigid mold, there is a problem that non-uniform pressure is applied to the uncured resin even when the atmospheric pressure is applied.

Meanwhile, in the case of the OML jig method under which a mandrel as a core jig is placed inside a reinforcement member, it is necessary to pull out the rigid mandrel after curing a composite material. Therefore, a shape of a composite material is limited to such a shape that a mandrel can be pulled out. In addition, the weight of a mandrel is also restricted to such a weight that the mandrel can be pulled out. In particular, when a mandrel having a large weight is placed, pulling out the mandrel requires working time and labor.

On the other hand, the OML jig method, under which a hollow inner member is disposed inside a reinforcement member and integrated with the reinforcement member, requires placing a cowl plate, which is a rigid mold, outside the reinforcement member.

Even if a bladder bag is placed inside a reinforcement member instead of placing a hollow inner member, the bladder bag is deformed from an ideal shape during thermal curing of a composite material since the bladder bag itself does not have a function to keep a shape. Therefore, also in a case of placing a bladder bag inside a reinforcement member, it is necessary to place a cowl plate, which is a rigid mold, outside the reinforcement member. As a result, there is a problem that not only configuration of jigs becomes complicated but also non-uniform pressure is applied to an uncured resin even when the atmospheric pressure is applied since the uncured resin is put between an upper rigid mold and a lower rigid mold, similarly to the IML jig method.

Accordingly, an object of the present invention is to make it possible to easily mold a composite material structure having a hollow structure.

SUMMARY OF THE INVENTION

In general, according to one implementation, a composite material molding jig includes a tube and at least one rigid plate. The tube has flexibility. The at least one rigid plate reinforces strength of the tube partially. The tube is used in a state where air is introduced inside the tube.

Further, according to one implementation, a composite material molding method includes using the above-mentioned composite material molding jig in order to produce a composite material structure.

DETAILED DESCRIPTION

A composite material molding jig and a composite material molding method according to implementations of the present invention will be described with reference to the accompanying drawings.

(First Implementation)

(Structure and Function of Composite Material Molding Jig)

Figure 1:
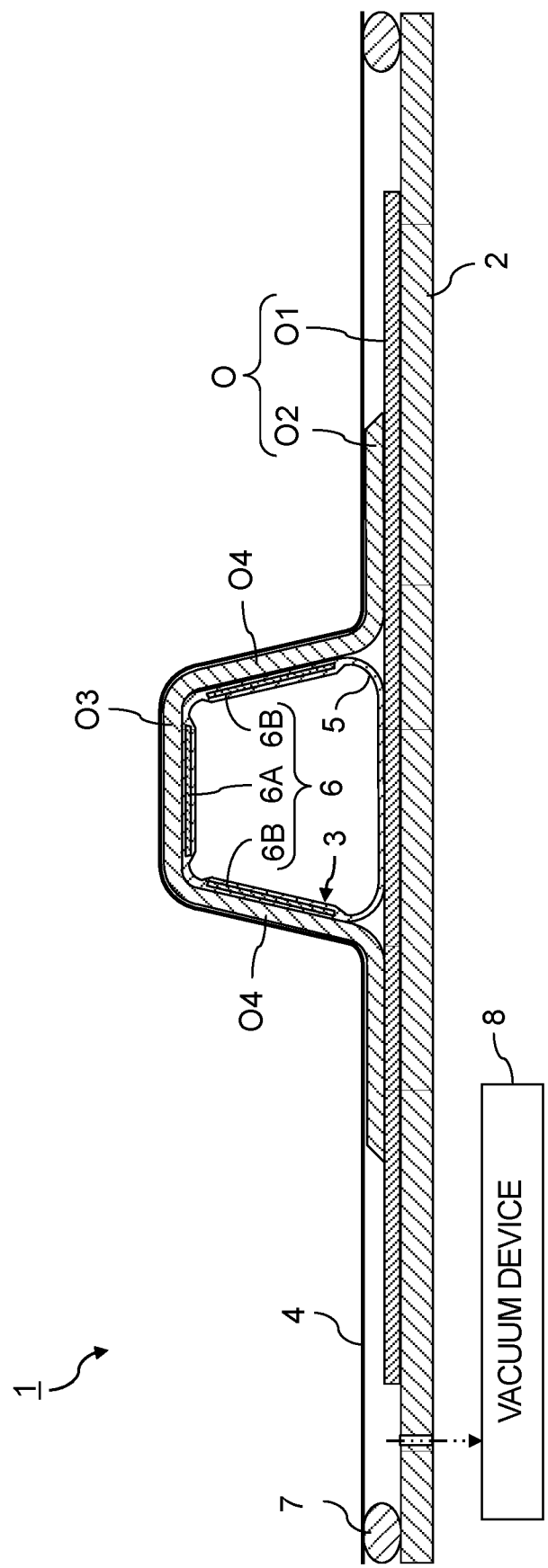
FIG. 1 is a cross sectional view showing a structure of a molding jig unit including a reinforced bladder bag which is a composite material molding jig according to the first implementation of the present invention.

FIG. 1 is a cross sectional view showing a structure of a molding jig unit including a reinforced bladder bag which is a composite material molding jig according to the first implementation of the present invention.

A molding jig unit 1 is a jig for mold a hollow composite material structure O which has a two-dimensional closed surface. Specifically, the molding jig unit 1 is a jig for laminating uncured prepregs, each consisting of a sheet-like fiber bundle impregnated with a thermosetting resin, shaping the laminated prepregs, and performs thermal curing of the laminated body of the prepregs.

Note that, sheet-like fibers may be impregnated with the thermosetting resin after the sheet-like fibers were laminated. In that case, the sheet-like prepregs laminated using the molding jig unit 1 are replaced with fiber sheets. A composite material molding method under which the impregnation with a resin is performed after fiber sheets were laminated is called an RTM method as mentioned above. A method of impregnating fiber sheets with a resin by a vacuum pressure, which is one of the RTM methods, is called a VaRTM (Vacuum assisted Resin Transfer Molding) method.

Alternatively, the molding jig unit 1 may also be used for molding a composite material under a hybrid molding method including laminating prepregs and the RTM method. Under the hybrid molding method, fiber sheets are laminated on a laminated body of prepregs, and subsequently, the laminated fiber sheets are impregnated with a resin. After that, the resin is heated and cured. Therefore, when the molding jig unit 1 is used for molding a composite material by the hybrid molding method, both prepregs and fiber sheets are laminated.

As a method for thermal curing of a composite material, a desired method can be adopted. Typical examples of a thermal curing method of a composite material include a method of carrying the uncured composite material into an autoclave molding apparatus and performing the thermal curing under pressurization by vacuuming. Meanwhile, various OoA (Out of autoclave) molding methods under which a composite material is molded without using any autoclave molding apparatus are also known. As a concrete example, a method for using an oven for the thermal curing of a composite material is known. Accordingly, the molding jig unit 1 on which an uncured and shaped composite material has been set can be carried into a desired apparatus according to a thermal curing method of the composite material.

Typical examples of a material of the composite material structure O include CFRP, which is a resin reinforced with carbon fibers, and GFRP, which is a resin reinforced with glass fibers. Meanwhile, examples of the composite material structure O which has a hollow structure include the composite material structure O composed of a panel O1 and at least one elongated structure O2, having a hat-shaped cross section, disposed on the panel O1, as exemplified in FIG. 1. The composite material structure O having such a structure is mainly used as a wing structure and a fuselage structure of an aircraft. Examples of the elongated structure O2 having a hat-shaped cross section include a reinforcement member, such as a rib and a stringer, having an elongated shape.

Using the molding jig unit 1 allows co-curing by which the reinforcement member and the panel O1 are simultaneously heated and cured, as well as laminating sheet-like prepregs or fiber sheets for the reinforcement member and the panel O1, and shaping an uncured resin for the reinforcement member and the panel O1. That is, after assembling the reinforcement member and the panel O1 in the uncured state, the reinforcement member and the panel O1 can be bagged, and simultaneously heated and cured.

For that purpose, the molding jig unit 1 is composed of a mold 2, a reinforced bladder bag 3 and a bagging film 4.

The mold 2 is a rigid mold which supports the OML side of the panel O1. The surface of the panel O1 in the OML side is not only limited to a plane, but may be a curved surface having a small curvature. Therefore, the surface of the mold 2 has an approximate flat shape which matches a surface of the molded panel O1 in the OML side. The mold 2 is used for laminating sheet-like prepregs or fiber sheets for the panel O1, shaping an uncured resin for the panel O1 in the OML side, and supporting the panel O1 during thermal curing of the panel O1 while holding a shape of the panel O1 in the OML side. Since the molding jig unit 1 supports the OML side of the panel O1 by the mold 2, it can be said that the molding jig unit 1 is a jig unit for the OML jig method.

The reinforced bladder bag 3 is a partial inflatable mandrel which is used as a core jig by introducing air into the inside. That is, the reinforced bladder bag 3 is used by being placed inside the composite material structure O which has a hollow structure. Therefore, the reinforced bladder bag 3 in the inflated state has a shape which fits to the inside of the composite material structure O which has a hollow structure.

The reinforced bladder bag 3 is composed of a tubular member 5 and at least one rigid plate member 6. The tubular member 5 has flexibility while each rigid plate member 6 has been entirely embedded in the internal portion of the tubular member 5 in order to reinforce strength of the tubular member 5 partially. In an example shown in FIG. 1, three plate members 6, facing in directions different form each other, have been inserted inside the tubular member 5 so that spaces between the plate members 6 are aligned in the direction perpendicular to the length direction of the tubular member 5.

The tubular member 5 is made of the same material as that of the conventional bladder bag. Specifically, the tubular member 5 can be made of an elastomer. The elastomer is a polymer material which has elastomeric properties. Meanwhile, each plate member 6 can be made of a metal or a composite material, such as CFRP, which has sufficient mechanical strength so as to function as a rigid body. In particular, when each plate member 6 is made of a composite material, the strength necessary for the plate member 6 can be secured while increase in weight of the reinforced bladder bag 3 due to providing the plate member 6 can be decreased. The tubular member 5 inside which the plate members 6 have been embedded can be produced by disposing the plate members 6 at appropriate positions, and subsequently, vulcanizing and molding an elastomer.

When a plurality of the plate members 6 are embedded in the tubular member 5, the plate members 6 can be disposed with clearances in the direction perpendicular to the length direction of the tubular member 5. Thereby, the tubular member 5 can partially deform on the cross section of the tubular member 5 while deformation of the tubular member 5 on a plane parallel to the length direction of the tubular member 5 can be prevented. In other words, the cross-sectional shape of the tubular member 5 can be changed to a limited extent while rigidity can be given to the tubular member 5 on a plane parallel to the length direction of the tubular member 5.

When the composite material structure O composed of the panel O1 and the elongated structure O2, of which cross section is hat-shaped, formed on the panel O1 is an object to be molded as shown in FIG. 1, the reinforced bladder bag 3 is used as a core jig disposed inside the elongated structure O2 of which cross section is hat-shaped. Therefore, the cross section of the tubular member 5 also has a shape which fits to the hat-shaped inside of the elongated structure O2. More specifically, the shape of the cross section of the tubular member 5 is an isosceles trapezoid to which round chamfering is applied on each of the four apexes.

The elongated structure O2, of which cross section is hat-shaped, has a structure in which a flat plate-like cap O3 blockades two flat plate-like webs O4. Thus, when the composite material structure O composed of the panel O1 and the elongated structure O2, of which cross section is hat-shaped, formed on the panel O1 is an object to be molded, the first plate member 6A and the second plate members 6B consisting of two plates can be embedded inside the tubular member 5 as exemplified in FIG. 1 so that the composite material structure O can be supported from the inside of the elongated structure O2 during curing.

The first plate member 6A reinforces strength of a part of the tubular member 5 which supports the cap O3 of the elongated structure O2 from the inside. Meanwhile, the second plate members 6B consisting of the two plates respectively reinforce strength of parts of the tubular member 5 which support the two webs O4 of the elongated structure O2 from the insides respectively. Therefore, the first plate member 6A is disposed at a position corresponding to the upper bottom of the isosceles trapezoid to which the round chamfering has been applied. Meanwhile, the second two plate members 6B are respectively disposed at positions corresponding to the two legs of the isosceles trapezoid to which the round chamfering has been applied.

On the other hand, the plate member 6 is not disposed on each of the parts of the tubular member 5 which fit with the round-chamfered corners of the elongated structure O2 from the insides and the panel O1 side of the tubular member 5. That is, the parts of the reinforced bladder bag 3 which supports the round-chamfered corners of the elongated structure O2 from the insides and the part in the panel O1 side of the reinforced bladder bag 3 are not reinforced with the plate members 6 and made of only the elastomer.

Therefore, it is possible to make the parts, having no plate member 6, of the reinforced bladder bag 3 follow to change in shape of the composite material structure O during thermal curing. That is, the reinforced bladder bag 3 can be deformed according to deformation of the elongated structure O2 during thermal curing. In addition, it is possible to pull out the reinforced bladder bag 3 from the inside of the elongated structure O2 easily by bending the reinforced bladder bag 3 inside, after thermal curing of the composite material structure O, since the plate member 6 is not inserted in the part in the panel O1 side.

When the reinforced bladder bag 3 having such a structure is used as a core jig, a shape of the elongated structure O2 can be kept before and after the thermal curing. Specifically, fibers impregnated with an uncured resin can be shaped into a form of the elongated structure O2 using the reinforced bladder bag 3, which has been reinforced with the plate members 6, without using a rigid mold. After that, the shaped uncured resin can be heated and cured while keeping the shape.

The bagging film 4 is a film for bagging the composite material structure O before the thermal curing. The bagging film 4 is stuck on the mold 2 and the tubular member 5 of the reinforced bladder bag 3 with sealant 7. The area covered with the bagging film 4 is decompressed by a vacuum device 8 having a vacuum pump.

Figure 2:
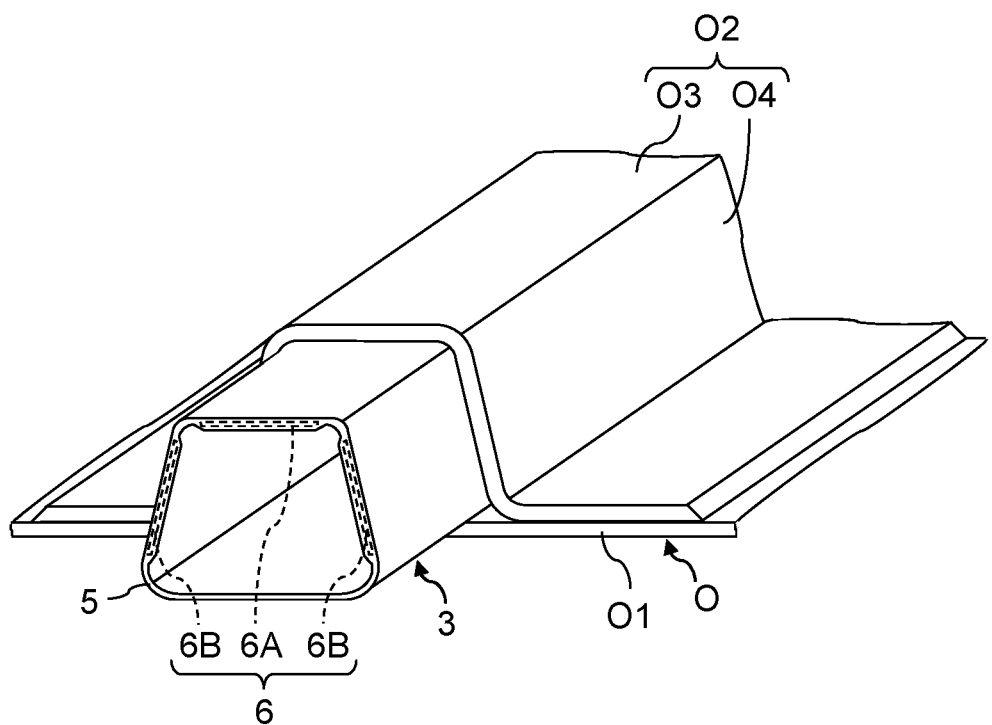
FIG. 2 is a perspective view which shows a structure of the end part of the reinforced bladder bag 3 shown in FIG. 1.

FIG. 2 is a perspective view which shows a structure of the end part of the reinforced bladder bag 3 shown in FIG. 1.

As shown in FIG. 2, the length of the reinforced bladder bag 3 is determined to be longer than the length of the elongated structure O2. Moreover, the length of the reinforced bladder bag 3 is determined so that the reinforced bladder bag 3 may protrude from the edges of the panel O1. This is because the inside of the reinforced bladder bag 3 is made to be opened to the outside while the bagging film 4 is stuck on the reinforced bladder bag 3, in the outside of an uncured resin, with the sealant 7.

Each end face of the reinforced bladder bag 3 is not necessarily to be occluded. This is because it is preferable to introduce the air for heating into the inside of the reinforced bladder bag 3 at the time of thermal curing of the composite material structure O. In addition, another reason is because it is preferable to insert a rigid positioning member 9 into the inside of the reinforced bladder bag 3 in order to prevent the reinforced bladder bag 3 from bending in the length direction of the reinforced bladder bag 3 at the time of positioning of the reinforced bladder bag 3.

On the contrary, the end faces of the reinforced bladder bag 3 may be occluded in order to secure strength while through holes for introducing air may be formed on the reinforced bladder bag 3. Alternatively, the end faces of the reinforced bladder bag 3 may be occluded with openable lids.

Figure 3:
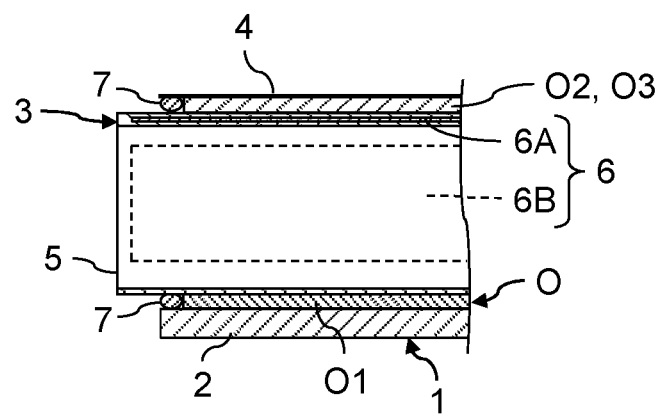
FIG. 3 is a longitudinal sectional view for explaining a method of sealing the end part of the reinforced bladder bag shown in FIG. 1.

FIG. 3 is a longitudinal sectional view for explaining a method of sealing the end part of the reinforced bladder bag 3 shown in FIG. 1.

As shown in FIG. 3, a part of the bagging film 4 which covers the uncured elongated structure O2 can be stuck on the reinforced bladder bag 3 by the sealant 7. Meanwhile, another part of the bagging film 4 which covers the uncured panel O1 can be stuck on the mold 2 by the sealant 7. Furthermore, a clearance, equivalent to the thickness of the panel O1, formed between the reinforced bladder bag 3 and the mold 2 can be also sealed by the sealant 7.

Thereby, the area covered with the bagging film 4 can be sealed so as to be evacuated by the vacuum device 8. That is, the atmospheric pressure can be applied on a resin before and after curing by discharging air from the area covered by the bagging film 4.

While FIG. 1 shows an example case where the composite material structure O composed of the panel O1 and the elongated structure O2, of which cross section is hat-shaped, formed on the panel O1 is an object to be molded, the reinforced bladder bag 3 can be used for molding processing of various composite material structures each having a hollow structure formed with at least one two-dimensional closed surface.

Figure 4:
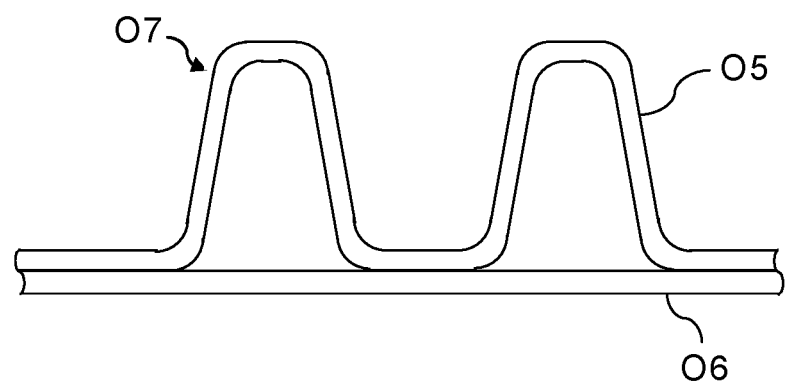
FIG. 4 is a cross sectional view showing an example of a corrugated stringer and a panel, to which the corrugated stringer is attached, composing a composite material structure, which can be molded by using the reinforced bladder bags shown in FIG. 1 as core jigs.

FIG. 4 is a cross sectional view showing an example of a corrugated stringer O5 and a panel O6, to which the corrugated stringer O5 is attached, composing a composite material structure O7, which can be molded by using the reinforced bladder bags 3 shown in FIG. 1 as core jigs.

As shown in FIG. 4, the composite material structure O7 composed of the panel O6 and the corrugated stringer O5 attached on the panel O6 can be molded using a plurality of the reinforced bladder bags 3. The corrugated stringer O5 has a corrugated structure formed by coupling a plurality of reinforcement members, each having a hat-shaped cross section, with each other. Specifically, the composite material structure O7 can be heated and cured in a state where the reinforced bladder bag 3 has been placed in each of the spaces, surrounded by closed surfaces respectively, which are formed between the corrugated stringer O5 and the panel O6.

Figure 5:
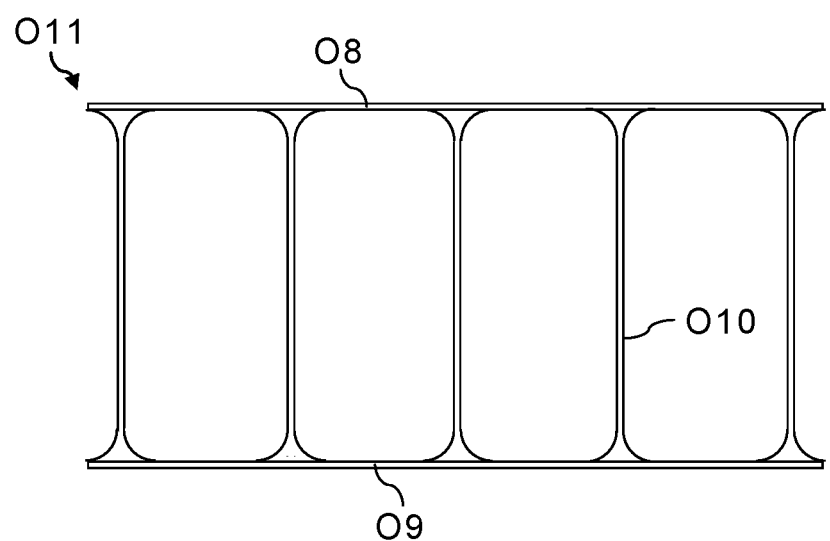
FIG. 5 is a cross sectional view showing an example of an upper panel, a lower panel and stringers coupling the upper panel to the lower panel, composing a composite material structure, which can be molded by using the reinforced bladder bags shown in FIG. 1 as core jigs.

FIG. 5 is a cross sectional view showing an example of an upper panel O8, a lower panel O9 and stringers O10 coupling the upper panel O8 to the lower panel O9, composing a composite material structure O11, which can be molded by using the reinforced bladder bags 3 shown in FIG. 1 as core jigs.

As shown in FIG. 5, the composite material structure O11 having a structure in which the upper panel O8 is coupled to the lower panel O9 with the plurality of the stringers O10 can be molded using a plurality of the reinforced bladder bags 3. Specifically, the composite material structure O11 can be heated and cured in a state where the reinforced bladder bag 3 has been placed in each of the spaces, surrounded by closed surfaces respectively, which are formed among the upper panel O8, the lower panel O9 and each adjacent two out of the stringers O10. As a matter of course, the cross section of the stringer O10 may has a desired shape other than I-shape.

(Composite Material Molding Method Using Composite Material Molding Jig)

Next, a composite material molding method for producing the hollow composite material structure O, having a two-dimensional closed surface, using the molding jig unit 1 including the reinforced bladder bag 3 will be described.

Figure 6:
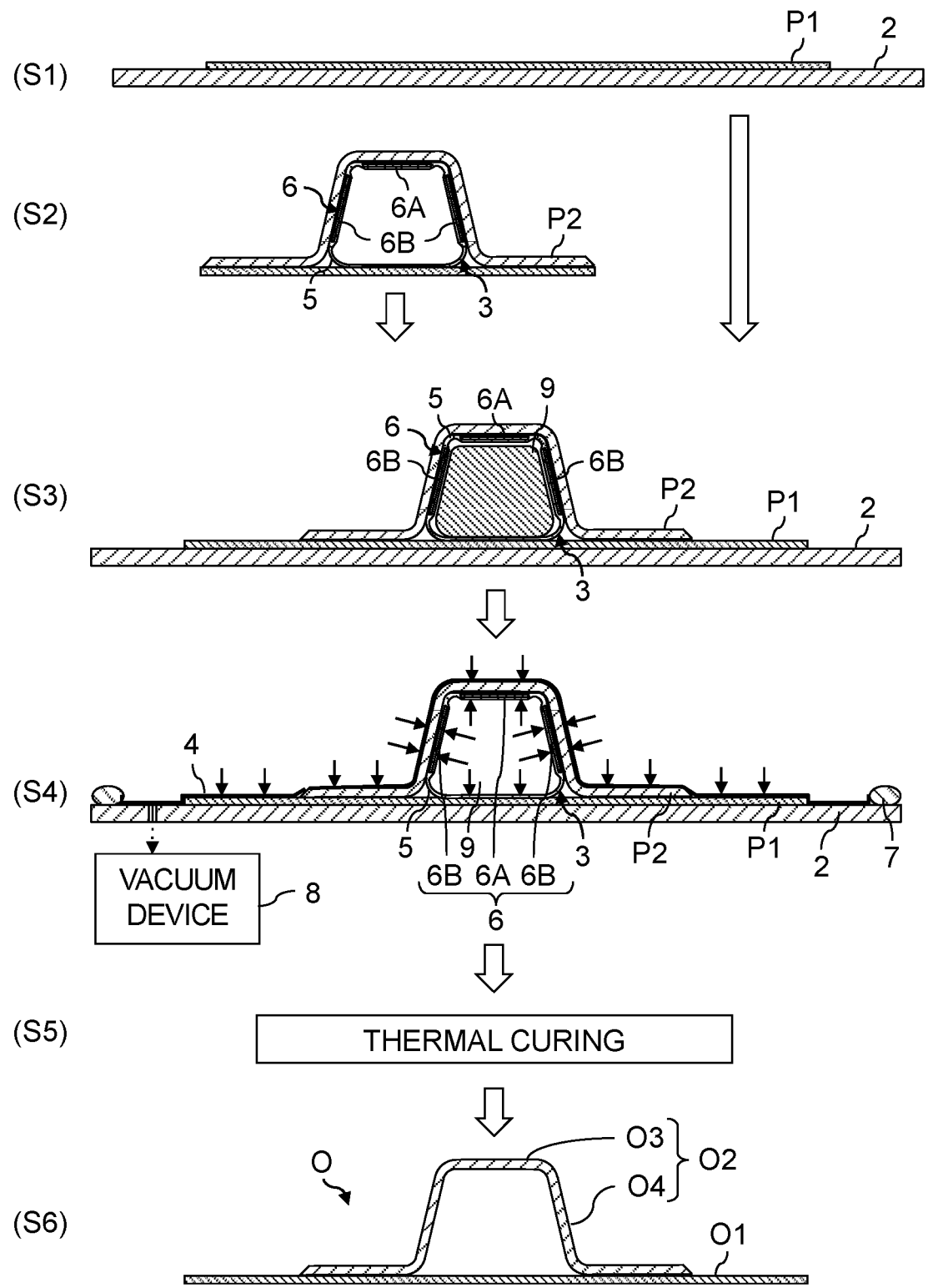
FIG. 6 is a flow chart which shows the first example of a method for molding the composite material structure using the molding jig unit shown in FIG. 1.

FIG. 6 is a flow chart which shows the first example of a method for molding the composite material structure O using the molding jig unit 1 shown in FIG. 1.

At first, in step S1, sheet-like prepregs P1 for the panel O1 are laminated on the mold 2. Meanwhile, in step S2, sheet-like prepregs P2 for the elongated structure O2, which is a reinforcement of the panel O1, are laminated on the reinforced bladder bag 3. The prepregs P1 for the panel O1 and the prepregs P2 for the elongated structure O2 can be laminated on the mold 2 and the reinforced bladder bag 3 with automatic laminating devices respectively. Alternatively, the prepregs P1 for the panel O1 and the prepregs P2 for the elongated structure O2 may be respectively laminated manually by a worker.

The reinforced bladder bag 3 on which the prepregs P2 for the elongated structure O2 are laminated has been partially reinforced with the plate members 6. Specifically, strength of the part of the tubular member 5 which supports the cap O3 of the elongated structure O2 from the inside has been reinforced with the first plate member 6A. Meanwhile, strength of the parts of the tubular member 5 which supports the two webs O4 of the elongated structure O2 from the insides respectively have been reinforced with the two second plate members 6B respectively. Accordingly, the laminated body of the prepregs P2 for the elongated structure O2 can be shaped according to a shape of the elongated structure O2 only by laminating the prepregs P2 for the elongated structure O2 on the reinforced bladder bag 3.

Note that, the laminated body of the prepregs P2 for the elongated structure O2 may be shaped using a rigid jig, such as the positioning member 9 as described below.

Next, in step S3, the reinforced bladder bag 3 on which the sheet-like prepregs P2 for the elongated structure O2 have been laminated is placed on the laminated sheet-like prepregs P1 for the panel O1.

Not that, the sheet-like prepregs P2 for the elongated structure O2 may be laminated on the reinforced bladder bag 3 after placing the reinforced bladder bag 3 on the sheet-like prepregs P1 for the panel O1. Nevertheless, laminating the prepregs P1 for the panel O1 and the prepregs P2 for the elongated structure O2 separately before the assembly leads to shortening of the working time When the prepregs P1 for the panel O1 and the prepregs P2 for the elongated structure O2 are laminated separately, the laminated body of the prepregs P2 for the elongated structure O2, previously produced by laminating the prepregs P2 for the elongated structure O2 on a rigid mold for the elongated structure O2 and shaping the laminated prepregs P2 on the rigid mold for the elongated structure O2, may be placed on the reinforced bladder bag 3. In other words, a preform, which is an uncured composite material, for the elongated structure O2 may be shaped not by the reinforced bladder bag 3 but by another rigid jig. In this case, the preform for the elongated structure O2 is shaped by the rigid jig. Therefore, the preform can be produced with high quality.

The reinforced bladder bag 3 has an elongated structure, and also has flexibility. Therefore, when the reinforced bladder bag 3 is long, the reinforced bladder bag 3 bends while the reinforced bladder bag 3 is being conveyed with a hoist or the like even when the reinforced bladder bag 3 has been reinforced with the plate members 6. In particular, it is difficult to convey and position the reinforced bladder bag 3, on which the prepregs P2 for the elongated structure O2 have been laminated, while keeping a shape of the laminated body of the prepregs P2 for the elongated structure O2.

Accordingly, it is desirable to place the reinforced bladder bag 3 on the sheet-like prepregs P1 in a state where the rigid positioning member 9 for preventing the reinforced bladder bag 3 from bending has been inserted inside the reinforced bladder bag 3, from a viewpoint of placing the reinforced bladder bag 3 on a more accurate position. The positioning member 9 may be inserted inside the reinforced bladder bag 3 before laminating the prepregs P2 for the elongated structure O2, or may be inserted inside the reinforced bladder bag 3 after laminating the prepregs P2 for the elongated structure O2.

When the positioning member 9 is inserted inside the reinforced bladder bag 3 before laminating the prepregs P2 for the elongated structure O2, the rigidity of the reinforced bladder bag 3 can be secured better at the time of laminating the prepregs P2 for the elongated structure O2. That is, the rigidity of the reinforced bladder bag 3 can be kept equally to that of a rigid mold. Therefore, a preform for the elongated structure O2 can be produced with quality equivalent to that of a preform for the elongated structure O2 shaped using a rigid mold even in a case of using the reinforced bladder bag 3 for shaping the preform for the elongated structure O2.

It is appropriate to design a shape of the positioning member 9 to be similar to a shape of a space formed inside the reinforced bladder bag 3 so that the reinforced bladder bag 3 can be prevented from bending appropriately and the positioning member 9 can be pulled out from the reinforced bladder bag 3. Therefore, the positioning member 9 has an elongated structure of which cross sectional shape is an isosceles trapezoid having round-chamfered four vertexes. In addition, it is appropriate to make a clearance between a size of the outer surface of the positioning member 9 and a size of the inner surface of the reinforced bladder bag 3 so that the positioning member 9 can be easily pulled out from the reinforced bladder bag 3.

When the assembly of the laminated body of the prepregs P1 for the panel O1 and the laminated body of the prepregs P2 for the elongated structure O2 has been completed, bagging are performed in step S4. Specifically, the laminated sheet-like prepregs P1 for the panel O1 and the laminated sheet-like prepregs P2 for the elongated structure O2 are covered by the bagging film 4. At this time, the laminated body of the prepregs P1 for the panel O1 and the laminated body of the prepregs P2 for the elongated structure O2 are covered by the bagging film 4 so that the inside of the reinforced bladder bag 3 may not be sealed but be opened to the outside.

Then, the vacuum device 8 drives and air is discharged from the area covered with the bagging film 4. That is, the area covered with the bagging film 4 is decompressed by the vacuum device 8. Thereby, a difference pressure between the atmospheric pressure applied from the outside of the bagging film 4 and a vacuum pressure in the area covered with the bagging film 4 is applied on the area covered with the bagging film 4.

At this time, the pressure inside the reinforced bladder bag 3 becomes the atmospheric pressure since the inside of the reinforced bladder bag 3 is not sealed by the bagging film 4. Therefore, the atmospheric pressure applied on the reinforced bladder bag 3 from the outside of the reinforced bladder bag 3 through the bagging film 4 and the laminated body of the prepregs P2 for the elongated structure O2 balances with the atmospheric pressure applied on the reinforced bladder bag 3 from the inside of the reinforced bladder bag 3. Furthermore, the flat parts of the reinforced bladder bag 3 which fit to the cap O3 and the webs O4 of the uncured elongated structure O2 have been reinforced with the first plate member 6A and the second plate members 6B respectively. As a result, a shape of the laminated body of the prepregs P2 for the elongated structure O2 can be kept by the reinforced bladder bag 3, according to a shape of the elongated structure O2 after molding, before and after the bagging.

Next, in step S5, the laminated body of the prepregs P1 for the panel O1 and the laminated body of the prepregs P2 for the elongated structure O2 which have been bagged, i.e., the uncured thermosetting resin reinforced with the fiber sheets is heated and cures.

For that purpose, the laminated body of the prepregs P1 for the panel O1 and the laminated body of the prepregs P2 for the elongated structure O2 which have been bagged are carried into an oven or an autoclave apparatus together with the mold 2 and the reinforced bladder bag 3. Then, the laminated body of the prepregs P1 for the panel O1 and the laminated body of the prepregs P2 for the elongated structure O2 which have been pressurized are heated by the oven or the autoclave apparatus. Thereby, the composite material structure O composed of the panel O1 and the elongated structure O2 attached to the panel O1 are co-cured and molded.

While the composite material structure O is being heated and cured, the composite material structure O deforms slightly due to the thermal curing. Meanwhile, the reinforced bladder bag 3 has flexibility except for the flat parts in the cap O3 side and in the web O4 sides, which have been reinforced with the first plate member 6A and the second plate members 6B respectively since a material of the tubular member 5 which composes the reinforced bladder bag 3 is an elastomer. Therefore, even when the composite material structure O including the elongated structure O2 deforms due to the thermal curing, the reinforced bladder bag 3 can be fit with the inner surface of the elongated structure O2. Thereby, the composite material structure O composed of the panel O1 and the elongated structure O2, having the hat-shaped cross section, attached on the panel O1 can be produced with high quality.

Next, in step S6, the thermally-cured composite material structure O is carried out from the oven or the autoclave apparatus together with the mold 2 and the reinforced bladder bag 3. Then, the thermally-cured composite material structure O is taken out from the molding jig unit 1 including the reinforced bladder bag 3.

As a part of the work for taking out the composite material structure O, the reinforced bladder bag 3 is removed from the thermally-cured composite material structure O. At this time, the reinforced bladder bag 3 can be easily deformed inward since no plate member 6 is embedded in the panel O1 side of the tubular member 5 composing the reinforced bladder bag 3. Therefore, the reinforced bladder bag 3 can be easily pulled out from the inside of the thermally-cured elongated structure O2. Note that, the positioning member 9 for preventing the reinforced bladder bag 3 from bending can be pulled out from the reinforced bladder bag 3 after the bagging or the thermal curing.

Although FIG. 6 shows the composite material molding method in which the prepregs P1 for the panel O1 and the prepregs P2 for the elongated structure O2 are laminated, heated and cured for producing the hollow composite material structure O, the hollow composite material structure O may also be produced by a VaRTM method.

Figure 7:
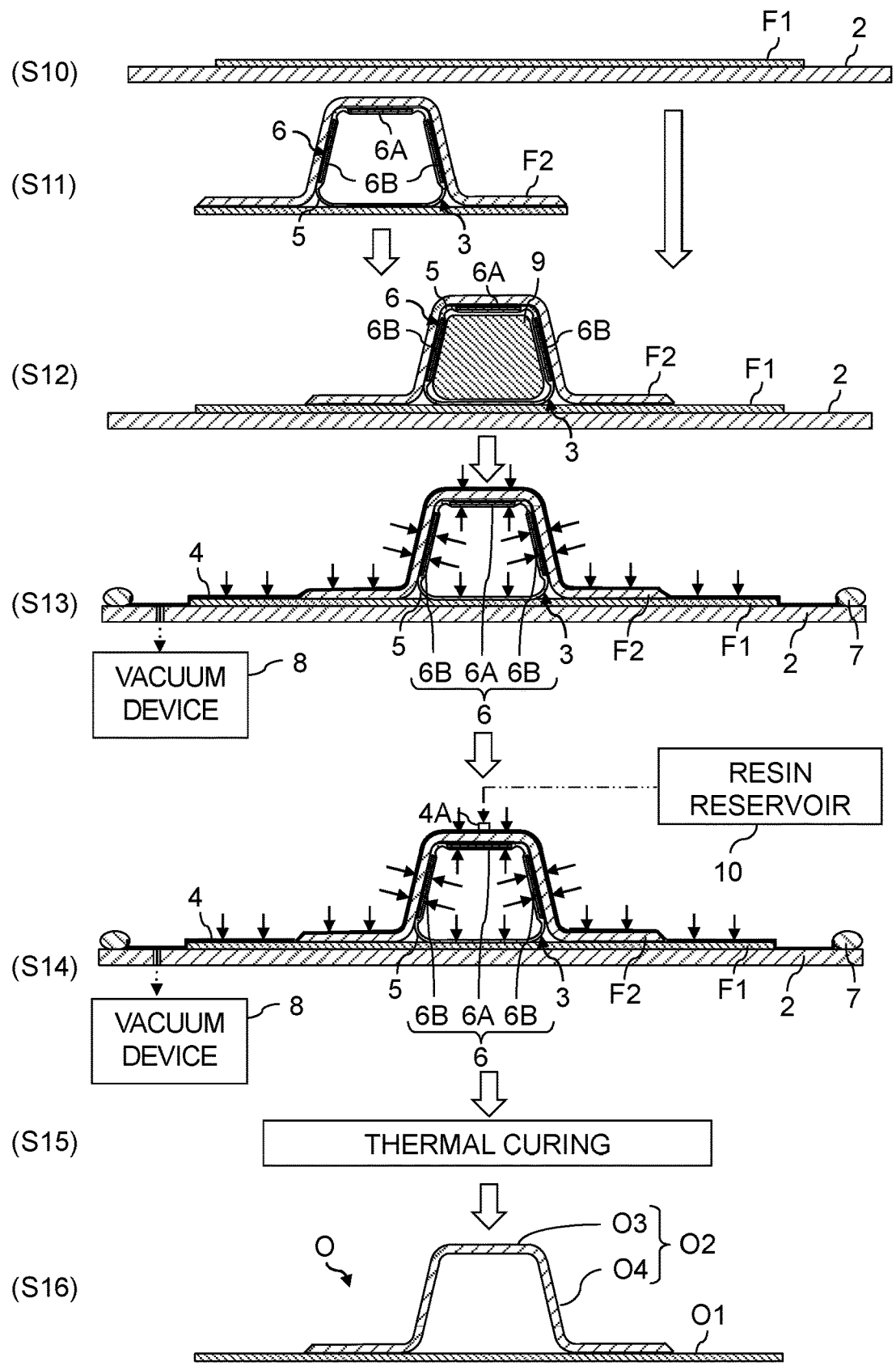
FIG. 7 is a flow chart which shows the second example of a method for molding the composite material structure using the molding jig unit shown in FIG. 1.

FIG. 7 is a flow chart which shows the second example of a method for molding the composite material structure O using the molding jig unit 1 shown in FIG. 1.

Firstly, in step S10, fiber sheets F1 for the panel O1 are laminated on the mold 2. Meanwhile, in step S11, fiber sheets F2 for the elongated structure O2, which is a reinforcement of the panel O1, are laminated on the reinforced bladder bag 3. The fiber sheets F1 for the panel O1 and the fiber sheets F2 for the elongated structure O2 can be laminated on the mold 2 and the reinforced bladder bag 3 respectively by automatic lamination devices. Alternatively, a worker may manually laminate the fiber sheets F1 for the panel O1 and the fiber sheets F2 for the elongated structure O2. Note that, the fiber sheets F2 may be bound with binder, as necessary, since the fiber sheets F2 are not adhesive.

Next, in step S12, the reinforced bladder bag 3 on which the fiber sheets F2 for the elongated structure O2 have been laminated is placed on the laminated fiber sheets F1 for the panel O1.

Note that, the fiber sheets F2 for the elongated structure O2 may be laminated on the reinforced bladder bag 3 after placing the reinforced bladder bag 3 on the fiber sheets F1 for the panel O1. Nevertheless, laminating the fiber sheets F1 for the panel O1 and the fiber sheets F2 for the elongated structure O2 separately before the assembly leads to shortening of working time.

In a case of producing the composite material structure O under the VaRTM method, it is desirable to place the reinforced bladder bag 3 on the fiber sheets in a state where the rigid positioning member 9 for preventing the reinforced bladder bag 3 from bending has been inserted inside the reinforced bladder bag 3, from a viewpoint of placing the reinforced bladder bag 3 on a more accurate position.

Next, in step S13, bagging is performed. Specifically, the laminated fiber sheets F1 for the panel O1 and the laminated fiber sheets F2 for the elongated structure O2 are covered with the bagging film 4. At this time, the laminated body of the fiber sheets F1 for the panel O1 and the laminated body of the fiber sheets F2 for the elongated structure O2 are covered with the bagging film 4 so that the inside of the reinforced bladder bag 3 may not be sealed but be opened to the outside.

Then, the vacuum device 8 drives and air is discharged from the area covered with the bagging film 4. That is, the area covered with the bagging film 4 is decompressed by the vacuum device 8. Thereby, a difference pressure between the atmospheric pressure applied from the outside of the bagging film 4 and a vacuum pressure in the area covered with the bagging film 4 is applied on the area covered with the bagging film 4.

Next, in step S14, an uncured thermosetting resin is injected into the area covered with the bagging film 4. That is, the uncured thermosetting resin is supplied to the area covered with the bagging film 4 from a resin reservoir 10. Thereby, the fiber sheets F1 for the panel O1 and the fiber sheets F2 for the elongated structure O2 can be impregnated with the uncured thermosetting resin.

The uncured thermosetting resin may be injected not only from a position where the fiber sheets F1 for the panel O1 have been laminated but also from a position where the fiber sheets F2 for the elongated structure O2 have been laminated. Then, the fiber sheets F2 for the elongated structure O2 can be promptly impregnated with the uncured resin. As a result, the time required for the impregnation of the resin can be shortened.

When the composite material structure O is produced under the VaRTM method and the uncured resin is supplied from at least a position where the fiber sheets F2 for the elongated structure O2 have been laminated, a supply port 4A of the resin is attached to a part of the bagging film 4 which covers the laminated body of the fiber sheets F2 for the elongated structure O2. FIG. 7 shows an example case of supplying the resin from both of a position where the fiber sheets F1 for the panel O1 have been laminated and a position where the fiber sheets F2 for the elongated structure O2 have been laminated.

A pressure of the inside of the reinforced bladder bag 3 becomes the atmospheric pressure before and after the injection of the resin since the inside of the reinforced bladder bag 3 does not sealed by the bagging film 4. Therefore, the atmospheric pressure applied on the reinforced bladder bag 3 from the outside of the reinforced bladder bag 3 through the bagging film 4 and the laminated body of the fiber sheets F2 for the elongated structure O2, which has been impregnated with the resin, balances with the atmospheric pressure applied on the reinforced bladder bag 3 from the inside of the reinforced bladder bag 3. Furthermore, the flat parts of the reinforced bladder bag 3, which fit to the uncured cap O3 and the uncured webs O4 of the elongated structure O2, have been reinforced with the first plate member 6A and the second plate members 6B respectively.

As a result, after injecting the resin, the laminated body of the fiber sheets F2 for the elongated structure O2, which has been impregnated with the resin, can be shaped according to a shape of the elongated structure O2 after molding. In addition, the shaped form of the laminated body of the fiber sheets F2 for the elongated structure O2, which has been impregnated with the resin, can be kept by the reinforced bladder bag 3.

After the bagging and the injecting of the resin, the uncured thermosetting resin reinforced with the fiber sheets consisting of the laminated body of the fiber sheets F1 impregnated with the resin for the panel O1 and the laminated body of the fiber sheets F2 impregnated with the resin for the elongated structure O2 is thermally cured, in step S15.

For that purpose, the laminated body of the fiber sheets F1 impregnated with the resin for the panel O1 and the laminated body of the fiber sheets F2 impregnated with the resin for the elongated structure O2 are carried into an oven or an autoclave apparatus together with the mold 2 and the reinforced bladder bag 3, similarly to step S5 in FIG. 6. Then, the laminated body of the fiber sheets F1 impregnated with the resin for the panel O1 and the laminated body of the fiber sheets F2 impregnated with the resin for the elongated structure O2, which have been pressurized, are heated by the oven or the autoclave apparatus. Thereby, the composite material structure O composed of the panel O1 and the elongated structure O2 attached to the panel O1 are co-cured and molded. As a result, the composite material structure O composed of the panel O1 and the elongated structure O2, having the hat-shaped cross section, attached on the panel O1 can be produced with high quality.

Next, in step S16, the thermally cured composite material structure O is carried out from the oven or the autoclave apparatus together with the mold 2 and the reinforced bladder bag 3. After that, the thermally cured composite material structure O is taken out from the molding jig unit 1 including the reinforced bladder bag 3. At this time, the reinforced bladder bag 3 can be easily pulled out from the inside of the elongated structure O2 by deforming the panel O1 side of the reinforced bladder bag 3, which has not been reinforced with the plate member 6, inward, similarly to step S6 in FIG. 6.

Besides the composite material molding methods shown in FIG. 6 and FIG. 7 respectively, the composite material structure O composed of the panel O1 and the elongated structure O2, having the hat-shaped cross section, attached on the panel O1 can be also produced by the hybrid molding method including laminating prepregs and the VaRTM method, as described above. As a concrete example, the laminated body of the fiber sheets F1 impregnated with the resin for the panel O1 can be produced by laminating the prepregs P1 while the laminated body of the fiber sheets F2 impregnated with the resin for the elongated structure O2 can be produced by the VaRTM method. As a matter of course, not only the composite material structure O composed of the panel O1 and the elongated structure O2, having the hat-shaped cross section, attached on the panel O1, but also a desired hollow composite material structure can be produced by the above-mentioned composite material molding method.

(Effects)

The above-mentioned composite material molding method is to mold a composite material structure which has a hollow structure, using a core jig consisting of the reinforced bladder bag 3 partially reinforced with the rigid plate members 6. That is, the reinforced bladder bag 3 is a bladder bag to which a function to keep a shape has been given while keeping extensibility required for molding.

Therefore, according to the composite material molding method using the reinforced bladder bag 3, flexibility in design of a hollow composite material structure to be molded can be secured while configuration of jigs can be simplified more than a conventional one.

Figure 8:
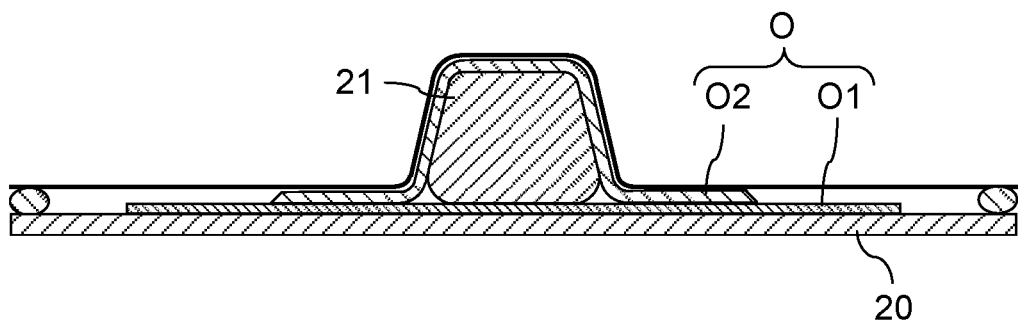
FIG. 8 shows a conventional composite material molding method for molding a composite material structure of which cross section is hat-shaped, under the OML jig method using a mandrel as a core jig.

FIG. 8 shows a conventional composite material molding method for molding a composite material structure of which cross section is hat-shaped, under the OML jig method using a mandrel as a core jig.

As shown in FIG. 8, one of the conventional composite material molding methods for producing the composite material structure O composed of the panel O1 and the elongated structure O2, having the hat-shaped cross section, attached on the panel O1 is a method of directing the OML side of the panel O1 downward and placing the uncured composite material structure O on an OML mold 20 while placing a solid mandrel 21 inside the uncured elongated structure O2. However, using the solid mandrel 21 limits a shape of the composite material structure O to be a shape allowing pulling out the mandrel 21. Moreover, handling operation, including conveyance of the mandrel 21, requires labor.

On the contrary, the reinforced bladder bag 3 can be deformed. Therefore, the reinforced bladder bag 3 can be easily pulled out from the inside of the thermal cured elongated structure O2. Consequently, flexibility in design of not only the composite material structure O composed of the panel O1 and the elongated structure O2, having the hat-shaped cross section, attached on the panel O1, but also another hollow composite material structure, can be secured. Moreover, handling operation of the reinforced bladder bag 3 including conveyance of the reinforced bladder bag 3 is easy since the reinforced bladder bag 3 is hollow and light weight.

Figure 9:
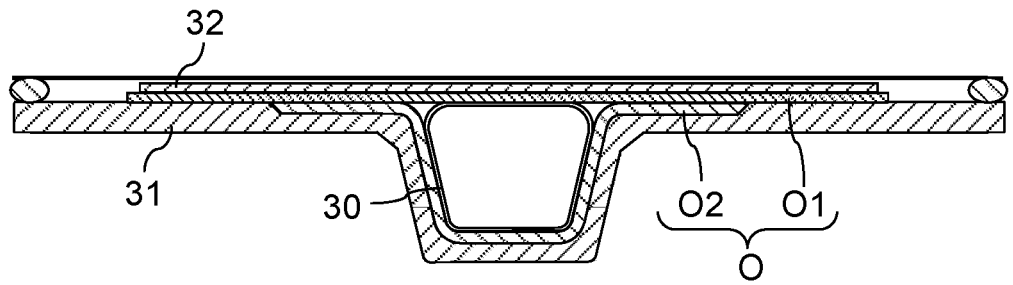
FIG. 9 shows a conventional composite material molding method for molding a composite material structure of which cross section is hat-shaped, under the IML jig method using upper and lower molds in addition to a normal bladder bag.

FIG. 9 shows a conventional composite material molding method for molding a composite material structure of which cross section is hat-shaped, under the IML jig method using upper and lower molds in addition to a normal bladder bag.

As shown in FIG. 9, another conventional composite material molding method of producing the composite material structure O composed of the panel O1 and the elongated structure O2, having the hat-shaped cross section, attached on the panel O1 is a method of directing the IML side of the panel O1 downward and inserting an unreinforced bladder bag 30 into the inside of the uncured elongated structure O2 while supporting the whole uncured composite material structure O from two directions with an IML side mold 31 and an OML side mold 32. However, the IML jig method requires the IML side mold 31 having a complicated structure. Furthermore, there is disadvantage that the panel O1 is unstably supported before and after curing since the panel O1 is supported by the bladder bag 30 which is not reinforced.

On the contrary, the OML jig method using the reinforced bladder bag 3 does not require any mold having a complicated structure in order to produce the composite material structure O. Furthermore, the panel O1 can be stably supported by the rigid mold 2.

Figure 10:
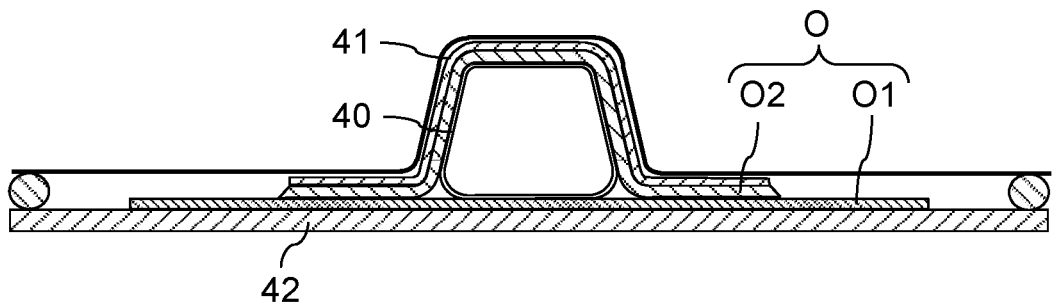
FIG. 10 shows a conventional composite material molding method for molding a composite material structure of which cross section is hat-shaped, under the OML jig method using upper and lower molds in addition to a normal bladder bag.

FIG. 10 shows a conventional composite material molding method for molding a composite material structure of which cross section is hat-shaped, under the OML jig method using upper and lower molds in addition to a normal bladder bag.

As shown in FIG. 10, yet another conventional composite material molding method of producing the composite material structure O composed of the panel O1 and the elongated structure O2, having the hat-shaped cross section, attached on the panel O1 is a method of directing the OML side of the panel O1 downward and inserting an unreinforced bladder bag 40 into the inside of the uncured elongated structure O2 while supporting the whole uncured composite material structure O from two directions with an IML side mold 41, called a cowl plate, and an OML side mold 42.

On the contrary, the OML jig method using the reinforced bladder bag 3 can produce the composite material structure O without the cowl plate serving as the IML side mold 41. That is, no cowl plate is required for avoiding troubles, such as deformation of the reinforced bladder bag 3 to a cylindrical shape during the thermal curing of the composite material structure O as well as strain and/or denting of the cap O3 and the webs O4 due to the gravity.

Moreover, using the reinforced bladder bag 3 makes it possible to omit a rigid jig which has been conventionally placed in the atmosphere side. Accordingly, the labor and time required for setting, removal, cleaning or the like of jigs can be reduced. Moreover, weight of the composite material structure O including jigs can be reduced. Therefore, not only conveyance becomes easy, but a volume of object to be heated can be small. As a result, the time and energy required for the thermal curing of the composite material structure O can be reduced.

In addition, the composite material molding method using the reinforced bladder bag 3 differs from a conventional composite material molding method with disposing an uncured resin between upper and lower rigid molds in the point that no rigid mold is placed in the atmosphere side. Accordingly, pressure corresponding to the atmospheric pressure can be uniformly applied on the composite material structure O during the thermal curing. As a result, the composite material structure O can be produced with high quality.

Moreover, in a case of producing the composite material structure O by the VaRTM method, a resin can be injected from a position in the elongated structure O2 side since no rigid mold is placed in the atmosphere side. Accordingly, the time required to impregnate fibers with a resin, which is a problem in the VaRTM method, can be shortened. In addition, a resin distribution media consist of a net made of plastic or the like can be placed outside the elongated structure O2 for efficient impregnation with the resin.

(Second Implementation)

Figure 11:
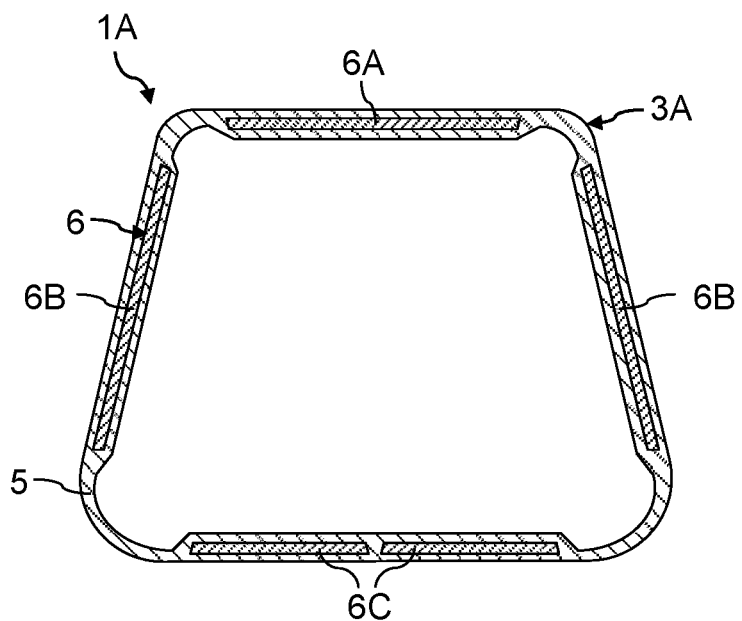
FIG. 11 is a cross sectional view showing a structure of a reinforced bladder bag which is a composite material molding jig according to the second implementation of the present invention.

FIG. 11 is a cross sectional view showing a structure of a reinforced bladder bag which is a composite material molding jig according to the second implementation of the present invention.

A molding jig unit 1A in the second implementation shown in FIG. 11 is different from the molding jig unit 1 in the first implementation in a structure of a reinforced bladder bag 3A that the third plate members 6C are embedded in the panel O1 side of the tubular member 5. Since other configurations and actions of the molding jig unit 1A in the second implementation are not substantially different from those of the molding jig unit 1 in the first implementation, the same signs are attached to the same elements and the corresponding elements while explanation thereof is omitted.

As shown in FIG. 11, the third plate members 6C in the panel O1 side in addition to the first plate member 6A in the cap O3 side of the elongated structure O2, having the hat-shaped cross section, and the second plate members 6B including the two plates in the web O4 sides of the elongated structure O2 can be embedded in the tubular member 5 composing the reinforced bladder bag 3A. Then, the reinforced bladder bag 3A can be reinforced with the third plate members 6C also in the panel O1 side.

It is desirable to divide a plate, which should be embedded in the panel O1 side of the tubular member 5, into a plurality of the third plate members 6C. Specifically, it is desirable to dispose the plurality of the third plate members 6C in the panel O1 side of the tubular member 5 so that the third plate members 6C do not overlap with each other. In an example shown in FIG. 11, the third plate members 6C, consisting of two plates disposed to have clearance from each other, have been embedded in the panel O1 side of the tubular member 5.

When the reinforced bladder bag 3A is reinforced with the divided third plate members 6C as described above, strength of the reinforced bladder bag 3A in the panel O1 side can be partially reinforced by the third plate members 6C while the reinforced bladder bag 3A can be bent easily in the panel O1 side. Accordingly, the reinforced bladder bag 3A can be easily pulled out from the thermally cured composite material structure O.

This applies not only to the composite material structure O composed of the panel O1 and the elongated structure O2, having the hat-shaped cross section, attached on the panel O1 but to another hollow composite material structure. Specifically, strength of the reinforced bladder bag 3A can be partially reinforced while the reinforced bladder bag 3A can be pulled out easily from a hollow composite material structure by bending the reinforced bladder bag 3A so long as the tubular member 5 is reinforced in the same direction with a plurality of the plate members 6 disposed in parallel so that thickness directions of the plate members 6 become same to each other.

(Third Implementation)

Figure 12:
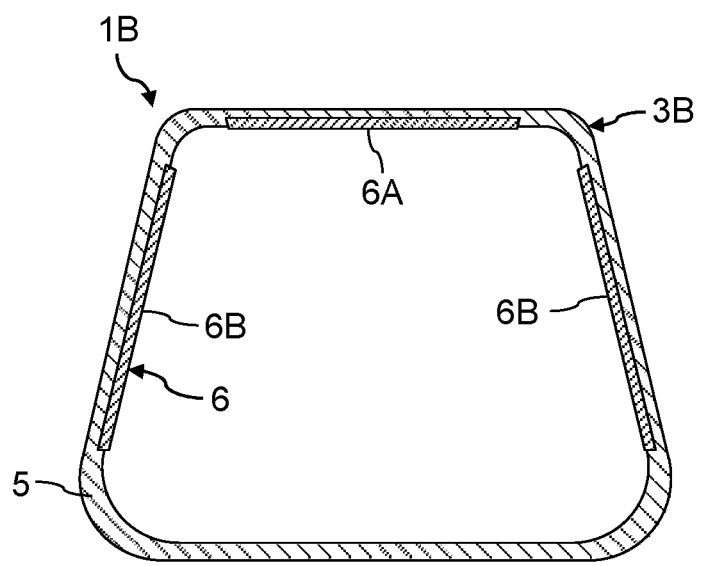
FIG. 12 is a cross sectional view showing a structure of a reinforced bladder bag which is a composite material molding jig according to the third implementation of the present invention.

FIG. 12 is a cross sectional view showing a structure of a reinforced bladder bag which is a composite material molding jig according to the third implementation of the present invention.

A molding jig unit 1B in the third implementation shown in FIG. 12 is different from the molding jig unit 1 in the first implementation in a structure of a reinforced bladder bag 3B that a part of each plate member 6 is embedded in the tubular member 5. Other configurations and actions of the molding jig unit 1B in the third implementation are not substantially different from those of the molding jig unit 1 in the first implementation. Therefore, only the reinforced bladder bag 3B is illustrated, and the same signs are attached to the same elements and the corresponding elements while explanation thereof is omitted.

As shown in FIG. 12, the reinforced bladder bag 3B can also be composed by embedding only a part of each plate member 6 in the tubular member 5, instead of embedding the whole of each plate member 6 in the tubular member 5. In this case, each plate member 6 can be exchanged, as necessary. Therefore, a part or the all of the plate members 6 can be exchanged easily, for example, when one or some of the plate members 6 deformed, or when the plate members 6 having different strength are to be used. As a matter of course, in the second implementation, at least one plate member 6 may be partially embedded in the tubular member 5, instead of embedding the whole of the plate members 6 in the tubular member 5.

(Fourth Implementation)

Figure 13:
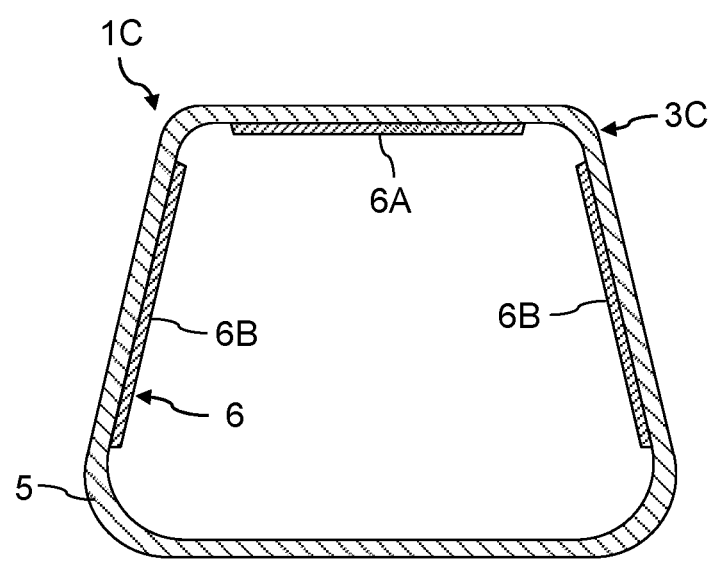
FIG. 13 is a cross sectional view showing a structure of a reinforced bladder bag which is a composite material molding jig according to the fourth implementation of the present invention.

FIG. 13 is a cross sectional view showing a structure of a reinforced bladder bag which is a composite material molding jig according to the fourth implementation of the present invention A molding jig unit 1C in the fourth implementation shown in FIG. 13 is different from the molding jig unit 1 in the first implementation in a structure of a reinforced bladder bag 3C that each plate member 6 are stuck on the inner surface of the tubular member 5. Other configurations and actions of the molding jig unit 1C in the fourth implementation are not substantially different from those of the molding jig unit 1 in the first implementation. Therefore, only the reinforced bladder bag 1C is illustrated, and the same signs are attached to the same elements and the corresponding elements while explanation thereof is omitted.

As shown in FIG. 13, the reinforced bladder bag 3C can also be composed by sticking one surface of each plate member 6 on the inner surface of the tubular member 5 with adhesive, instead of embedding the plate members 6 in the tubular member 5. In this case, the reinforced bladder bag 3C can be produced by merely sticking the plate members 6 on an existing bladder bag as well as one or some of the plate members 6 can be exchanged, as necessary. Therefore, a part or the all of the plate members 6 can be exchanged or attached easily, for example, when one or some of the plate members 6 deformed, or when the plate members 6 having different strength are to be used, similarly to the third implementation. As a matter of course, in the second implementation, one surface of at least one plate member 6 may be stuck on the inner surface of the tubular member 5, instead of entirely embedding the plate members 6 in the tubular member 5.

(Other Implementations)

While certain implementations have been described, these implementations have been presented by way of example only, and are not intended to limit the scope of the invention. Indeed, the novel methods and systems described herein may be embodied in a variety of other forms; furthermore, various omissions, substitutions and changes in the form of the methods and systems described herein may be made without departing from the spirit of the invention. The accompanying claims and their equivalents are intended to cover such forms or modifications as would fall within the scope and spirit of the invention.

What is claimed is:

1. A composite material molding jig for producing a hollow composite material structure having a two-dimensional closed surface, the hollow composite material structure having an elongated structure and a panel, the elongated structure having a hat-shaped cross section, the elongated structure having a cap, two webs and round-chamfered corners, the elongated structure being placed on the panel, the jig supporting an inside of the elongated structure, the jig comprising:

a tube having flexibility; and rigid plates which reinforce strength of the tube partially, the rigid plates each being made of a metal or a carbon fiber reinforced plastic, wherein the tube is used in a state where air is introduced inside the tube, the rigid plates comprise:

a first plate that reinforces strength of a first part of the tube, the first part supporting an inside of the cap of the elongated structure; and two second plates that reinforce strength of second parts of the tube respectively, the second parts supporting insides of the two webs of the elongated structure, the rigid plates are placed with clearances in a direction perpendicular to a length direction of the tube, the rigid plates being disposed such as to allow partial deformation of the tube in a cross section of the tube and suppress deformation of the tube in a plane parallel to the length direction of the tube, the partial deformation including inward deformation for pulling out the tube from an inside of the hollow composite material structure, and no rigid plate is disposed on each of third parts of the tube, the third parts fitting with the round-chamfered corners of the elongated structure from insides of the elongated structure.

2. The composite material molding jig according to claim 1, wherein rigid plates are not disposed on a panel side.

3. The composite material molding jig according to claim 1, wherein the rigid plates further include third plates which do not overlap with each other, the third plates being disposed on a panel side.

4. The composite material molding jig according to claim 1, wherein a whole of each of the rigid plates has been entirely embedded in an internal portion of the tube.

5. The composite material molding jig according to claim 1, wherein a part of each of the rigid plates has been embedded in the tube.

6. The composite material molding jig according to claim 1, wherein each of the rigid plates is stuck on an inner surface of the tube.

7. The composite material molding jig according to claim 1, wherein the tube is made of an elastomer.

8. A composite material molding method comprising:
using the composite material molding jig according to claim 1 in order to produce the hollow composite material structure.

9. The composite material molding method according to claim 8, comprising:
laminating first prepreg sheets or first fiber sheets for the panel on a mold;
placing the composite material molding jig, on which second prepreg sheets or second fiber sheets for a reinforcement of the panel have been laminated, on the laminated first prepreg sheets or first fiber sheets for the panel;
bagging the laminated first and second prepreg sheets or fiber sheets by covering the laminated first and second prepreg sheets or fiber sheets with a bagging film and decompressing an area covered with the bagging film, an inside of the composite material molding jig being excluded from being sealed by the bagging film;
producing the hollow composite material structure by thermal curing of an uncured fiber reinforced thermosetting resin after the bagging; and
removing the composite material molding jig from the composite material structure after the thermal curing.

10. The composite material molding method according to claim 9,
wherein the composite material molding jig is placed on the laminated first prepreg sheets or first fiber sheets in a state that a rigid positioning jig for preventing flexure of the composite material molding jig has been inserted into the inside of the composite material molding jig, further comprising:
pulling the rigid positioning jig out from the composite material molding jig after the bagging or the thermal curing.

11. The composite material molding method according to claim 9, wherein
the first fiber sheets selected between the laminating first prepreg sheets or first fiber sheets for the panel are laminated on the mold while the second fiber sheets for the reinforcement are laminated on the composite material molding jig, further comprising:
impregnating the laminated first and second fiber sheets with an uncured thermosetting resin by injecting the uncured thermosetting resin into the area covered with the bagging film.

12. The composite material molding method according to claim 11, wherein
the uncured thermosetting resin is injected from at least a position where the second fiber sheets for the reinforcement have been laminated.

* * * * *